United States Patent [19]
Brown

[11] 3,723,820
[45] Mar. 27, 1973

[54] DEVICE FOR PROTECTING AGAINST A.C. TRANSIENT OVERLOADS WITH MEANS FOR AUTOMATICALLY RESETTING SAME

[76] Inventor: Dwight L. Brown, c/o Brown Radio & TV, Liberty Street, Barbourville, Ky. 40906

[22] Filed: Jan. 3, 1972

[21] Appl. No.: 215,060

[52] U.S. Cl. .................317/16, 317/22, 317/31, 317/50, 317/61.5
[51] Int. Cl. .................................................H02h 3/22
[58] Field of Search........317/50, 16, 22, 31, 61.5, 62

[56] References Cited

UNITED STATES PATENTS 3,353,066  11/1967  De Souza...........................317/16 X
3,493,814  2/1970  Watson et al.......................317/22 X
3,423,636  1/1969  Rowley..............................317/16 X

*Primary Examiner*—James D. Trammell
*Attorney*—John W. Melville et al.

[57] ABSTRACT

An arrangement for protecting transistorized equipment from transient A.C. overloads including a circuit having a Siemens tube, or other non-polarized gas filled tube, therein to fire and shunt the overload to ground. Also included is a current delay device or choke to allow the shunting circuitry to become actuated before the transient can reach the protected load. The circuitry includes a time delay-thermal relay to momentarily break the A.C. input to the protected load and to the Siemens tube causing it to discontinue arcing so that it may reset. A counting device may also be included for recording the number of times the Siemens tube fires.

8 Claims, 3 Drawing Figures

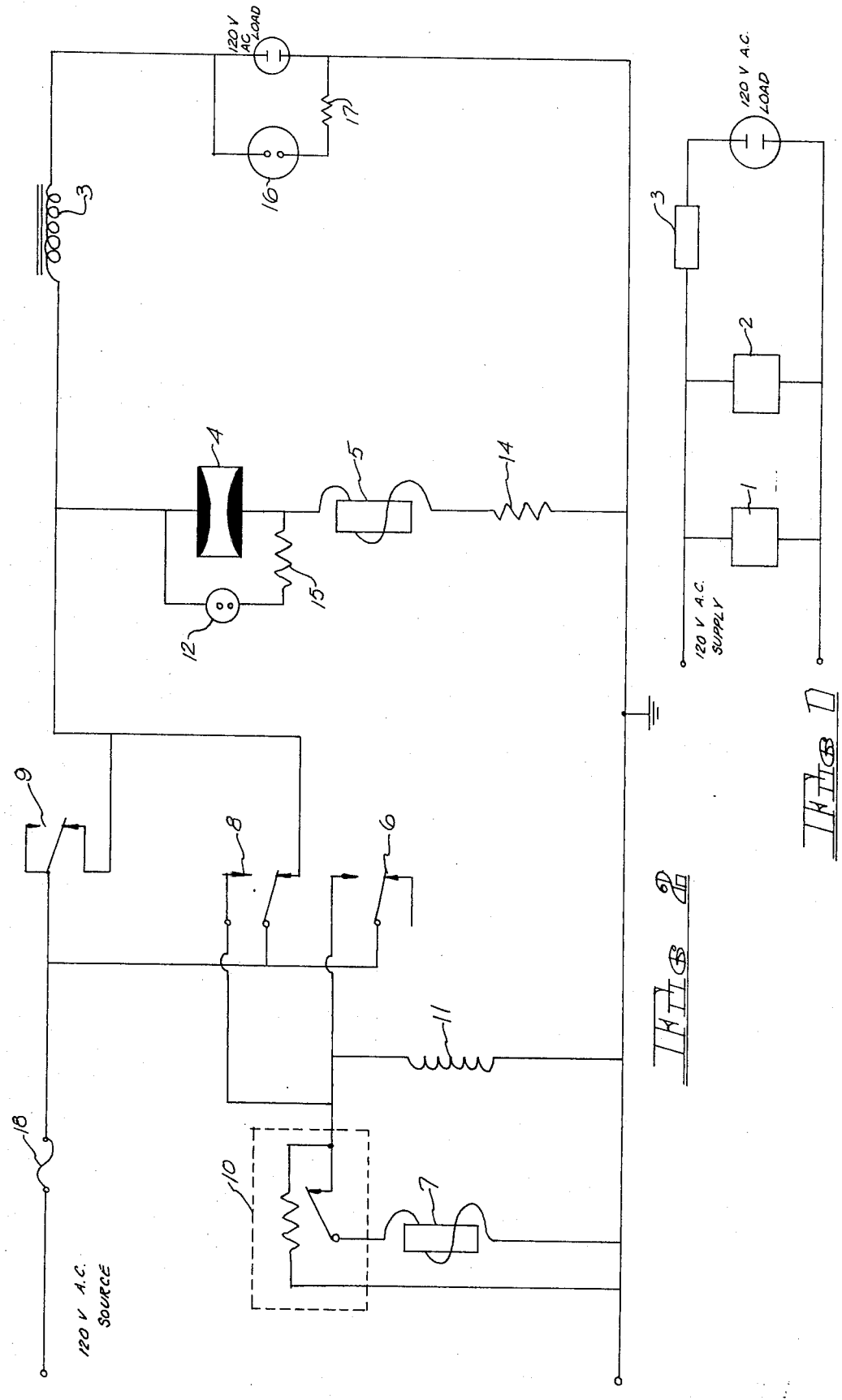

Patented March 27, 1973

DEVICE FOR PROTECTING AGAINST A.C. TRANSIENT OVERLOADS WITH MEANS FOR AUTOMATICALLY RESETTING SAME

BACKGROUND OF THE INVENTION

1. Field of the Invention

This invention is useful in protecting various A.C. current devices from transient overloads. Although such overloads may be caused by many factors, a common one is lightning. Spikes occasioned by lightning can have disastrous results on many loads, particularly transistorized amplification equipment such as found in cable television systems (CATV). The arrangement of the invention may readily be incorporated so as to protect such equipment. It may also be used to protect home wiring and the like wherein transistorized equipment is used.

2. Description of the Prior Art

The problem of possible damage to equipment by surges in electric power has long been recognized. Lightning spikes have been a primary factor. Although much equipment may stand up under such surges, the increased use of transistorized elements has accented the problem because transistors and the like are quite vulnerable to such surges in electric power.

A search was conducted in the United States Patent Office in order to determine the patentability of this invention and the following United States Patents were developed: U.S. Pat. Nos. 2,735,039 Schuh; 2,811,675 McGee; 2,959,717 Conger; 3,024,388 Blitchington; 3,181,033 Bakker; 3,286,131 Myers; 3,317,792 Sutherland; 3,365,617 Flanagan; 3,366,831 Lapple; 3,373,291 Peterson; 3,386,005 Roland; 3,407,335 Hartung; 3,408,525 Vahr; 3,443,223 Kennon; 3,475,653 Odenberg; and 3,573,550 Baker. Although it was the intent of the search to develop the art most pertinent to the claimed invention, no assertion is made that the best art was in fact found.

The developed prior art does not appear to disclose means for protecting transistorized equipment operating off of A.C. in such manner that the protection system will operate fast enough to do the job and then reset. Heretofore, although the equipment might be protected from, for example, the first lightning flash, it has often been necessary to go out into the storm to reset the shunting device in order to protect against other flashes. The arrangement of this invention overcomes this difficulty and automatically resets the shunting device after each lightning spike. Although Baker U.S. Pat. No. 3,573,550 and Odenberg U.S. Pat. No. 3,475,653 profess to reset automatically, neither includes a current delay to allow the extremely fast operation of the shunting device which is necessary to insure the protection sought.

SUMMARY OF THE INVENTION

This invention comprises the use of a non-polarized gas filled tube which fires in reaction to a sudden overload surge in the A.C. power supply to a load whereby to shunt the surge to ground before it can reach the protected load. A current delay device is included between the load and tube to insure that the tube will fire quickly enough. Additionally, other means are employed to momentarily cut off the A.C. power to the tube and load after the surge has occurred whereby the tube may reset, such other means immediately thereafter completing the normal A.C. supply to the load. Since these tubes may be operable only a given number of times before wearing out, it is desirable to incorporate a counter into the system so that such tubes may be replaced from time to time as indicated.

BRIEF DESCRIPTION OF THE DRAWINGS

FIG. 1 is a block diagram of the transient overload protector for use on A.C. voltage systems; indicated are the three main components.

FIG. 2 is the circuit diagram of the overload protector indicating necessary components in the normal state prior to overload caused by transient.

DESCRIPTION OF THE PREFERRED EMBODIMENTS

Figure 3:
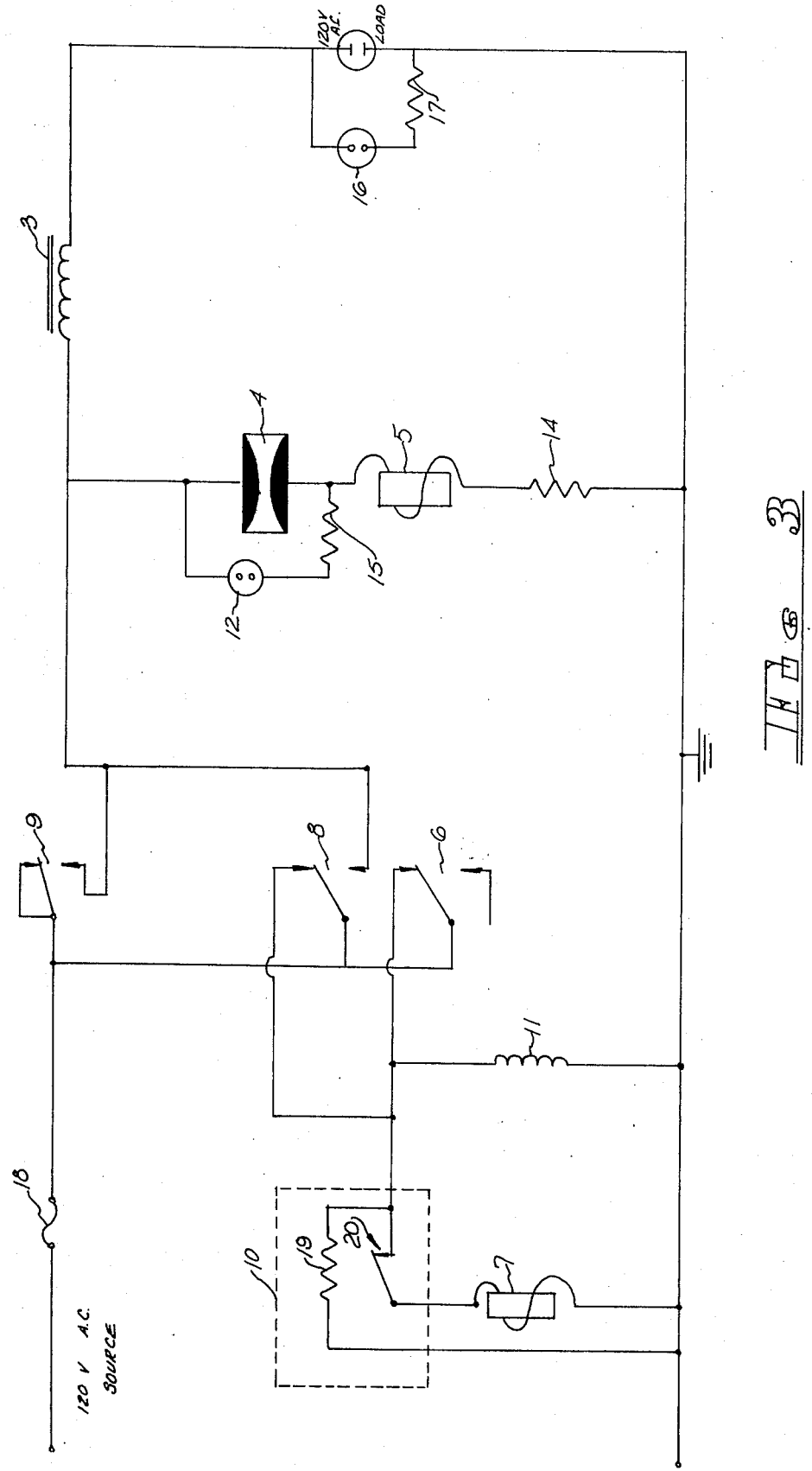
FIG. 3 is the circuit diagram of the overload protector immediately after occurrence of overload setting protection device into action.

Referring to the drawings, in particular to FIGS. 1 and 2, the three main components of the automatic transient overload protection device are shown. These are item 1 (FIG. 1) which consists of the time delay-thermal relay 10 similar to an Amperite thermostatic delay relay No. 115C2 and the 120 v A.C. relay 7 (FIG. 2) similar to a Potter & Brumfield 120vA.C. relay No. KRP11AG. Also included in 1 are the necessary current switching contacts 6 belonging to relay 5 and 8 and 9 belonging to relay 7 (FIG. 2).

Item 2 of FIG. 1 is the rapid acting shunting device consisting of a Siemens tube 4 (FIG. 2) or other non-polarized gas filled tube such as a Signalite 230 v Comm-Gap or Electrons Co.-EL-2600SL-200 surge arrester, designed to "short circuit" on a predetermined over-voltage. Also included in item 2 is a 6 v A.C. relay 5 of the Potter & Brumfield 6 v A.C. No. KRP11AG type which activates current switching contact 6 belonging to said relay 5. Item 14 is a current limiting resistor (Ohmite No. 0400C–25 ohm, 50 watt) and items 15 and 17 are voltage dropping resistors built into items 12 and 16 which are NE-51 pilot lights to indicate the readiness and operability of the shunting device and available current to the A.C. load, respectively.

In practice the voltage dropping resistor 15 has a resistance on the order of 100,000 ohms; this allows the neon bulb 12 to operate with 120 v applied. This resistor is built into the socket which holds the NE-51 bulb as is known in the art. The resistor 17 may be the same as the resistor 15. The resistor 14, however, is a true current limiting resistor the purpose of which is to protect the coil 5 and contacts 8 and 9. If, for example, the current isn't limited in the firing circuit comprised of items 4 and 5, too much current will flow and burn out relay 5, or damage contacts 8 and 9, or blow the main line fuse 18, any of which would render the protective device inoperative.

Item 3 of FIGS. 1 and 2 is a current delay device comprising a No. 12 copper wire wound on an iron core to have an inductance of 10 millihenries and a D.C. resistance of 0.11 ohm which permits activation of the shunting device and associated equipment 2 before the transient reaches the 120 v A.C. load to be protected. Incorporation of this current delay device 3 into the protection system is a very important part of this invention.

FIG. 2 shows the transient protector in the normal state. Contact 9 provides continuity of voltage to the load to be protected. The time delay-thermal relay 10 is de-energized due to contact 6 being in the de-energized position. The indictor lights 12 and 16 should be on showing readiness and operability of the shunting device and availability of current to the A.C. load.

FIG. 3 indicates the state of the system immediately after an overload occurred. The current delay device 3 allowed the Siemens tube or other nonpolarized gas filled tube to "fire" thus protecting the 120 v A.C. load and energizing the 6 v A.C. relay 5 which caused the switching contacts 6 to allow voltage to be applied to the time delay-thermal relay 10. Simultaneously voltage is applied to the switching relay 7 which activates contacts 8 and 9 breaking the supply of power to the load device to be protected and also allowing the Siemens tube 4 to reset itself by quenching any arc flowing through the tube 4. Following the passage of the preset time, usually on the order of one or two seconds, the time delay-thermal relay 10 deactivates the 120 v A.C. relay 7 allowing contacts 8 and 9 to return to the normal position of FIG. 2. During activation of relays 5, 7 and 10 the electrical impulse counter 11 (ITT No. CE40AN507 or the like) records the fact that these relays 5, 7 and 10 are activated. Throughout activation of contacts 6, 8 and 9 when power is cut off to the protective load, the indicator light 12 will be off indicating the loss of power to the protected device. As above indicated, the time delay-thermal relay 10 will be set to the predetermined number of seconds necessary to allow the shunting device 2 (FIG. 1) to reset itself and the tube 4 (FIGS. 2 and 3) to clear itself of any arcs.

Item 3 of FIGS. 1, 2 and 3 is a current delay device that provides sufficient delay of the current for the mechanical relays 5 and 7 to set the switching contacts 6, 8 and 9 and for the shunting device to divert all of the over voltage to ground.

The purpose of the time delay-thermal relay 10 is to insure that relay coil 7 remains energized, holding contacts 8 and 9 in the position shown in FIG. 3, as will be described in greater detail shortly, after the firing device 4 fires, keeping power off the firing device and the protected load for a pre-determined length of time. Contacts 8 and 9 actually take the voltage off the device 4 while the relay 10 acts as a holding device. When the contacts switch to the position shown in FIG. 3 current passes through a heating coil 19 shown as a resistor in this FIG. After a predetermined length of time, usually two or three seconds, the coil 19 in relay 10 heats sufficiently to open the relay contacts shown at 20 in relay 10. This takes power off the relay coil 7, allowing it to become deenergized and allowing contacts 8 and 9 to return to their normal position shown in FIG. 2.

The fuse 18 is excess current protection not directly related to the automatic resetting transient protector. It will, however, protect the apparatus from a complete short circuit if something should go wrong with the surge protecting device as a whole.

It will be understood that modifications may be made in the invention without departing from the scope and spirit thereof. It would be possible, for example, in CATV systems, to include a low pass filter ahead of the current delay device so as to keep any radiation of the high-frequency signals from getting on to the power lines. It will be further understood that while the invention is shown and described in terms of particular structures and circuits, the invention is not to be limited to these particular structures and circuits except in so far as they are specifically set forth in the subjoined claims.

The embodiments of the invention in which an exclusive property or privilege is claimed are defined as follows:

1. A device for protecting a load from a surge in the A.C. power supply to said load, said device comprising shunt means to shunt said surge to ground, choke means between said shunt means and said load, and reset means to momentarily break the A.C. power supply to said shunt means and to said load after said surge has been shunted to ground and to immediately thereafter reestablish the A.C. power to said load, said choke means comprising a current delay device to insure that the surge is shunted to ground before any of the surge can reach said load and while substantially maintaining the normal operating voltage.

2. The device of claim 1 in which said shunt means comprises a non-polarized gas filled tube, and said reset means comprises a relay connected to said shunt means.

3. The device of claim 2 including a counting means actuated each time said shunt means receives a said surge.

4. A means for protecting alternating current operated equipment from transient overloads, said overloads being caused by sources external to said equipment, said protecting means comprising: a shunting means comprising a rapid firing non-polarized gas filled tube connected to a relay; a current delay device to permit the overload to be shunted to ground before any of the damaging overload can reach said alternating current operated equipment; an automatic reset means actuated by said relay to provide for a resetting of said non-polarized gas filled tube and a power supply interruption to said alternating current power equipment to prevent damage from a second transient overload while said protecting means is in the process of shunting and resetting from a previous overload.

5. A protecting means as defined in claim 4 and including a counting device actuated each time said shunting means receives said overloads.

6. A protecting means as defined in claim 4 wherein the current delay device is located between the alternating current operated equipment to be protected and the shunting means, said current delay device slowing down the flow of current by several milliseconds while substantially maintaining the normal operating voltage.

7. A protecting means as defined in claim 4 wherein the shunting means is a Siemens tube or the like, said shunting means being located between said current delay device and said automatic reset means, said relay being activated by said Siemens tube discharging said overload.

8. A protecting means as defined in claim 4 wherein the automatic reset means is located between said shunting means and the alternating current power supply, said automatic reset means including current rerouting relays and a time delay-thermal relay which is activated when said shunting device relay is activated by discharge of said non-polarized gas filled tube, said time delay-thermal relay causing interruption of the power supply to said shunting means and said alternating current operated equipment by activation of said current rerouting relays, said time delay-thermal relay returning said protecting means to its normal state following a predetermined time.

* * * * *